US009672363B2

(12) United States Patent
Watanabe et al.

(10) Patent No.: US 9,672,363 B2
(45) Date of Patent: Jun. 6, 2017

(54) SECURITY METHOD FOR ENGINEERING TOOLS AND INDUSTRIAL PRODUCTS, AND SECURITY SYSTEM

(75) Inventors: Taku Watanabe, Chiyoda-ku (JP); Hiroshi Hamazaki, Chiyoda-ku (JP); Kunio Ooba, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/639,215

(22) PCT Filed: Apr. 14, 2010

(86) PCT No.: PCT/JP2010/056691
§ 371 (c)(1),
(2), (4) Date: Oct. 4, 2012

(87) PCT Pub. No.: WO2011/128993
PCT Pub. Date: Oct. 20, 2011

(65) Prior Publication Data
US 2013/0031603 A1    Jan. 31, 2013

(51) Int. Cl.
G06F 7/04          (2006.01)
G06F 21/60         (2013.01)

(52) U.S. Cl.
CPC .................................. *G06F 21/60* (2013.01)

(58) Field of Classification Search
CPC  G06F 21/10; H04L 63/0428; H04L 2209/603
(Continued)

(56) References Cited

U.S. PATENT DOCUMENTS 6,961,633 B1 * 11/2005 Marbach et al. ............... 700/97
7,032,029 B1 *  4/2006 Tanzman ................. G05B 9/03
                                                   700/82
(Continued)

FOREIGN PATENT DOCUMENTS

CN    101146697 A    3/2008
CN    101231682 A    7/2008
(Continued)

OTHER PUBLICATIONS

Taiwanese Office Action dated May 30, 2013 issued in Patent Application No. 099130449.
(Continued)

*Primary Examiner* — Dede Zecher
*Assistant Examiner* — Viral Lakhia
(74) *Attorney, Agent, or Firm* — Sughrue Mion, PLLC; Richard C. Turner

(57) ABSTRACT

The invention includes a read-restriction setting step of setting read restriction on a program stored in hardware of an industrial product in response to a read restriction request, and a read requesting step of transmitting a read request for the program to the industrial product from an engineering tool that is a read request source. In the read-restriction setting step unique individual information retained in the hardware of the industrial product or unique individual information retained in hardware for executing an engineering tool that is a read-restriction request source is registered as registration individual information, and in the read requesting step, unique individual information retained in hardware for executing the engineering tool that is the read request source or unique individual information retained in the hardware of the industrial product is compared with the registration individual information.

7 Claims, 15 Drawing Sheets

(58) Field of Classification Search
USPC .............. 726/1, 2–11; 700/97, 220; 455/7; 713/183, 163
See application file for complete search history.

(56) References Cited

U.S. PATENT DOCUMENTS

| | | | | |
|---|---|---|---|---|
| 7,314,169 | B1* | 1/2008 | Jasper | G06F 21/31 235/382 |
| 7,360,240 | B2* | 4/2008 | King | G06K 13/085 380/258 |
| 7,607,166 | B2* | 10/2009 | Coley et al. | 726/3 |
| 7,739,532 | B2* | 6/2010 | Grobman | 713/322 |
| 7,835,805 | B2* | 11/2010 | Hood et al. | 700/20 |
| 7,865,908 | B2* | 1/2011 | Garg et al. | 719/321 |
| 8,001,611 | B2* | 8/2011 | Nelson et al. | 726/27 |
| 8,055,910 | B2* | 11/2011 | Kocher | G06F 21/10 280/228 |
| 8,132,008 | B2* | 3/2012 | Fisher | H04L 63/0428 713/162 |
| 8,156,232 | B2* | 4/2012 | Callaghan et al. | 709/230 |
| 8,184,641 | B2* | 5/2012 | Alt | H04L 29/06027 370/352 |
| 8,429,393 | B1* | 4/2013 | Anderson et al. | 713/100 |
| 8,495,724 | B2* | 7/2013 | Devine et al. | 726/11 |
| 8,595,831 | B2* | 11/2013 | Skare | 726/22 |
| 2002/0056047 | A1* | 5/2002 | Lehman | 713/200 |
| 2003/0167411 | A1* | 9/2003 | Maekawa | H04L 63/0876 726/4 |
| 2004/0002877 | A1* | 1/2004 | Angelo et al. | 705/7 |
| 2004/0210767 | A1* | 10/2004 | Sinclair | H04L 29/06 726/6 |
| 2005/0114711 | A1* | 5/2005 | Hesselink et al. | 713/201 |
| 2005/0256939 | A1* | 11/2005 | Naismith et al. | 709/219 |
| 2006/0230454 | A1* | 10/2006 | Achanta et al. | 726/24 |
| 2007/0028294 | A1* | 2/2007 | Yamamoto et al. | 726/2 |
| 2007/0055753 | A1* | 3/2007 | Robb | G07F 17/32 709/220 |
| 2007/0079370 | A1* | 4/2007 | Jinkawa et al. | 726/19 |
| 2007/0101422 | A1* | 5/2007 | Carpenter | H04L 63/02 726/13 |
| 2007/0204323 | A1* | 8/2007 | Wilkinson et al. | 726/1 |
| 2008/0274689 | A1* | 11/2008 | Kuban | H04L 1/16 455/7 |
| 2008/0301779 | A1* | 12/2008 | Garg et al. | 726/4 |
| 2008/0320582 | A1* | 12/2008 | Chen et al. | 726/12 |
| 2009/0113546 | A1* | 4/2009 | Kim | G06F 11/1068 726/22 |
| 2009/0204814 | A1* | 8/2009 | Fisher | H04L 63/0428 713/162 |
| 2009/0288146 | A1* | 11/2009 | Olsson et al. | 726/4 |
| 2011/0066297 | A1* | 3/2011 | Saberi | F16K 31/046 700/287 |

FOREIGN PATENT DOCUMENTS

| | | |
|---|---|---|
| JP | 2002-099344 A | 4/2002 |
| JP | 2003-162461 A | 6/2003 |
| JP | 2003-167606 A | 6/2003 |
| JP | 2005-189913 A | 7/2005 |
| JP | 2006146566 A | 6/2006 |
| JP | 2006-259938 A | 9/2006 |
| JP | 2006-295747 A | 10/2006 |
| JP | 2007-122695 A | 5/2007 |
| JP | 2007-280348 A | 10/2007 |
| JP | 2008-083833 A | 4/2008 |
| JP | 2008-270972 A | 11/2008 |
| JP | 2008282362 A | 11/2008 |
| JP | 2010011322 A | 1/2010 |

OTHER PUBLICATIONS

Japanese Office Action, (Notice of Rejection) Aug. 13, 2013, Patent Application No. 2012-510507.

Japanese Patent Office, "Notice of Rejection," issued in connection with Japanese Patent Application No. 2012-510507, dated Feb. 18, 2014.

Korean Intellectual Property Office, "Notice of Preliminary Rejection," issued in connection with Korean Patent Application No. 10-2012-7027939, dated May 30, 2014.

The State Intellectual Property of China, "Office Action," issued in connection with Chinese Patent Application No. 201080066113.1, dated Aug. 29, 2014.

* cited by examiner

SECURITY METHOD FOR ENGINEERING TOOLS AND INDUSTRIAL PRODUCTS, AND SECURITY SYSTEM

CROSS REFERENCE TO RELATED APPLICATIONS

This application is a National Stage of International Application No. PCT/JP2010/056691 filed Apr. 14, 2010, the contents of all of which are incorporated herein by reference in their entirety.

FIELD

The present invention relates to a security method for engineering tools and industrial products, and a security system for applying the security method.

BACKGROUND

Conventionally, a method of using a password specified by a user as an authentication key is generally adopted to ensure security of a program stored in hardware of a factory automation (FA) product. The user having an access authority transmits the password together with a program read request to an FA device. In this case, any user not having the access authority can read the program if the user acquires the password by some means. This implies, for example, that a person with malicious intent may intercept the password and improperly execute reading of the program. Patent Literature 1 proposes a technique that enables to use a hardware key as an authentication key to enhance robustness of user authentication, for example.

CITATION LIST

Patent Literature

Patent Literature 1: Japanese Patent Application Laid-open No. 2007-122695

SUMMARY

Technical Problem

When a hardware key is used, a program read request is accepted only when authentication hardware is connected to hardware of an FA product. In this case, anyone on a network can read the program in a state where the authentication hardware device is connected to the FA product. For this reason, also when the authentication hardware device is used, a problem that it is difficult to ensure sufficient security occurs.

The present invention has been achieved in view of the above-mentioned circumstances and an object of the present invention is to provide a security method for engineering tools and industrial products and a security system, which can sufficiently ensure security.

Solution to Problem

In order to solve the above-mentioned problems and achieve the object, the present invention provides a security method for engineering tools and industrial products, the security method comprising: a read-restriction setting step of setting read restriction on a program stored in hardware of an industrial product in response to a read restriction request to the industrial product from an engineering tool that is a read-restriction request source; and a read requesting step of transmitting a read request for the program from an engineering tool that is a read request source to the industrial product, wherein in the read-restriction setting step, as registration individual information, unique individual information retained in the hardware of the industrial product is registered in hardware for executing the engineering tool that is a read-restriction request source, or unique individual information retained in hardware for executing the engineering tool that is the read-restriction request source is registered in the industrial product, and in the read requesting step, unique individual information retained in hardware for executing the engineering tool that is the read request source or unique individual information retained in the hardware of the industrial product is compared with the registration individual information.

Advantageous Effects of Invention

The security method for engineering tools and industrial products and the security system according to the present invention can ensure sufficient security.

DESCRIPTION OF EMBODIMENTS

Embodiments of a security method for engineering tools and industrial products and a security system according to the present invention will be described below in detail with reference to the drawings. The present invention is not limited to the embodiments.

First Embodiment

Figure 1:
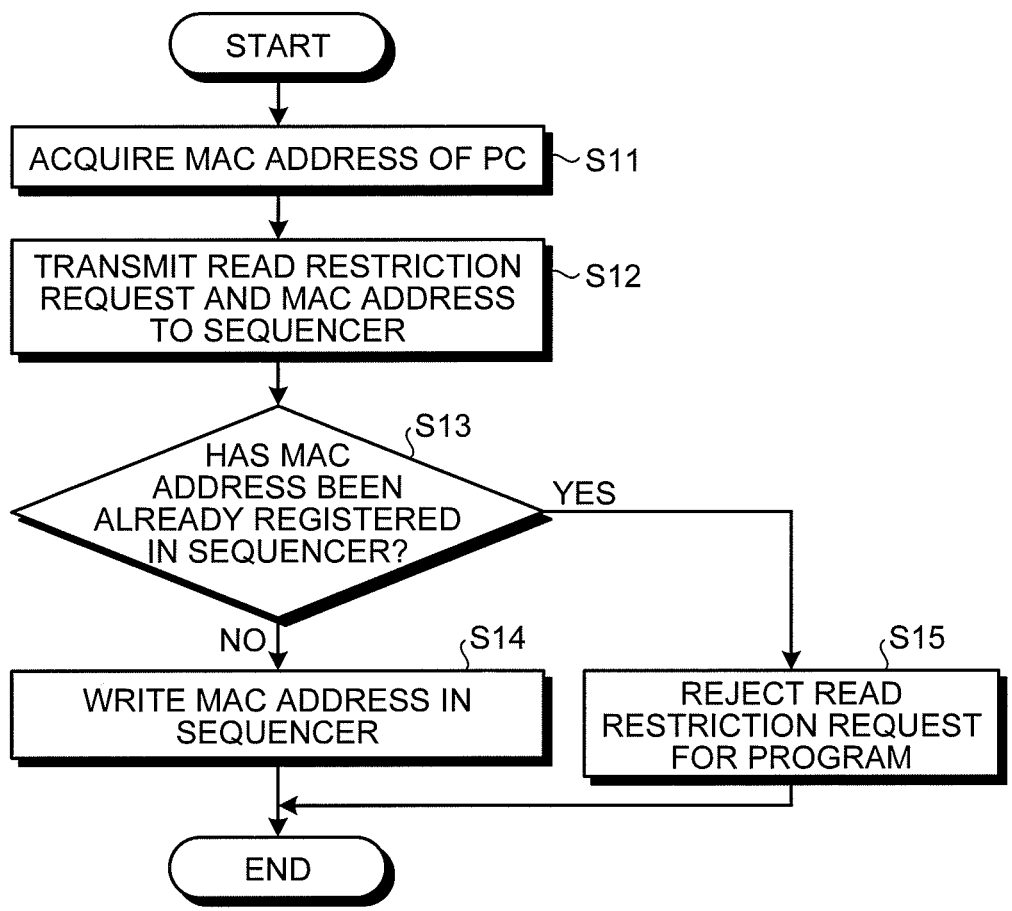
FIG. 1 is a flowchart for explaining a procedure of setting read restriction on a program in a security method for engineering tools and industrial products according to a first embodiment of the present invention.

FIG. 1 is a flowchart for explaining a procedure of setting read restriction on a program in a security method for engineering tools and industrial products according to a first embodiment of the present invention. The present embodiment is described by way of an example of a security system including personal computers (PCs) as hardware that executes engineering tools and a sequencer as hardware of an FA product (industrial product). The present embodiment is characterized in that media access control (MAC) addresses that are unique individual information pieces retained in the PCs are used for authentication to restrict reading of the program. In the present embodiment, the sequencer confirms authentication of the unique individual information.

From Step S11 to Step S15 that are read-restriction setting operations, read restriction on a program stored in the sequencer is set in response to a read restriction request to the FA product from an engineering tool that is a read-restriction request source. At Step S11, the engineering tool acquires a MAC address of a PC having the engineering tool installed therein.

At Step S12, the engineering tool transmits the MAC address acquired at Step S11 to the sequencer together with a read restriction request. At Step S13, the sequencer determines whether or not an MAC address has been already registered therein. When no MAC address is registered in the sequencer (NO at Step S13), the sequencer writes therein the MAC address received from the engineering tool (Step S14). In this way, the MAC address retained in the PC that is intended to execute the engineering tool as the read-restriction request source is registered in the FA product as registration individual information.

Meanwhile, when a MAC address has been already registered in the sequencer (YES at Step S13), the sequencer rejects the read restriction request for the program from the engineering tool (Step S15). Accordingly, when read restriction has been already set, the read restriction is protected.

Figure 2:
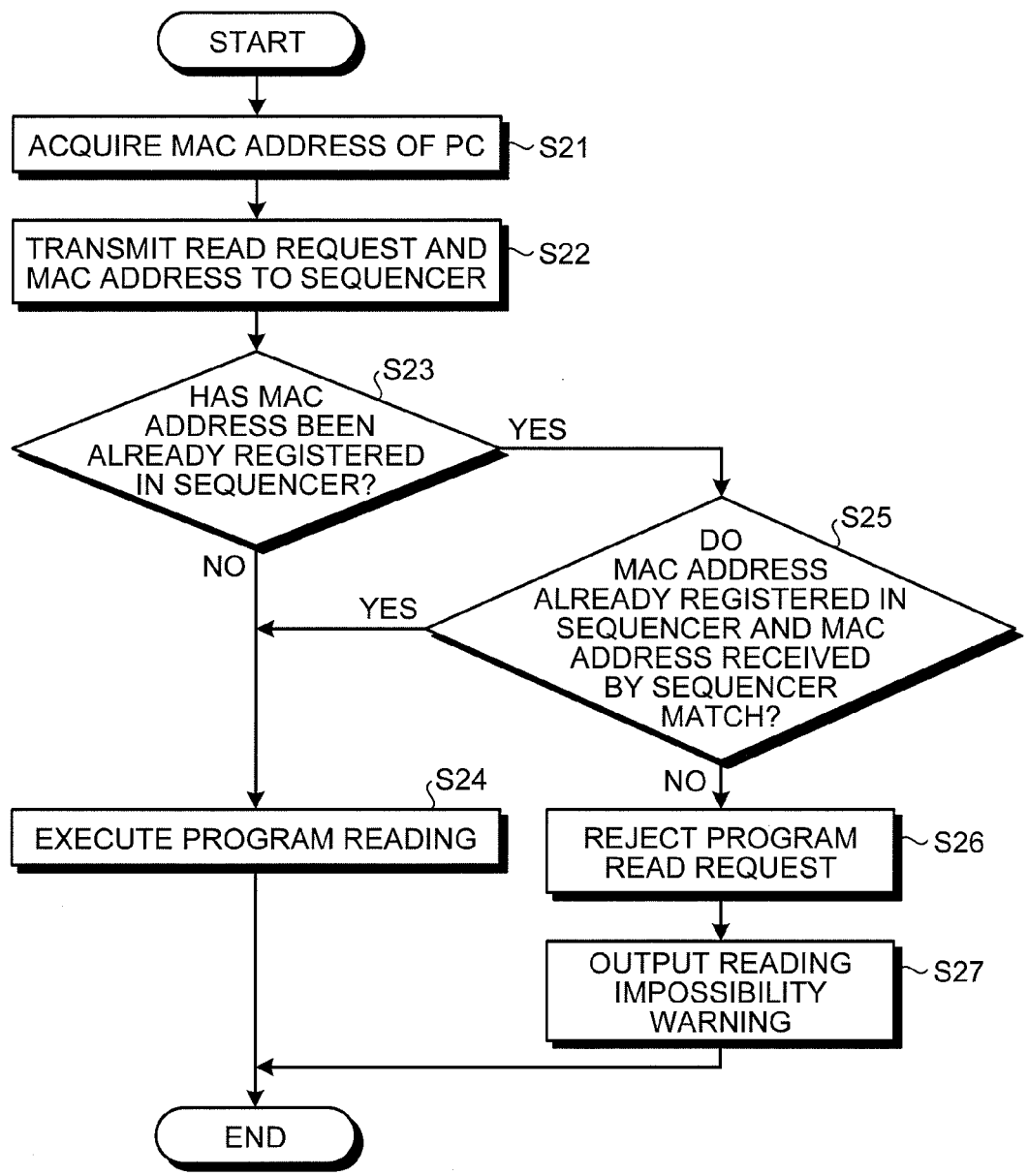
FIG. 2 is a flowchart for explaining a procedure of executing reading of a program and rejecting a read request, in response to the read request for the program according to the first embodiment.

FIG. 2 is a flowchart for explaining a procedure of executing reading of a program and rejecting a read request in response to the read request for the program. At Step S21, an engineering tool that is a read request source acquires a MAC address (retention individual information) of a PC having the engineering tool installed therein. At Step S22 that is a read requesting operation, the engineering tool transmits the MAC address acquired at Step S21 to a sequencer together with a read request. At Step S23, the sequencer determines whether or not a MAC address is already registered therein.

When no MAC address is registered in the sequencer (NO at Step S23), the sequencer executes reading of the program in response to the read request (Step S24). When no MAC address is registered, no read restriction is set and thus reading of the program is permitted in this case.

When a MAC address is registered in the sequencer (YES at Step S23), the sequencer compares the MAC address (registration individual information) registered therein with the MAC address (retention individual information) received from the engineering tool at Step S22 to determine whether or not the both addresses match (Step S25). When the MAC address registered in the sequencer and the MAC address received by the sequencer match (YES at Step S25), the sequencer executes reading of the program (Step S24).

Meanwhile, when the MAC address registered in the sequencer and the MAC address received by the sequencer do not match (NO at Step S25), the sequencer rejects the read request for the program (Step S26). Furthermore, the sequencer outputs a warning of reading impossibility at Step S27. The warning is outputted as display of a message or a sound output, for example. The warning of reading impossibility may be both or one of the message display and the sound output, or intentionally, the warning does not need to be performed.

Figure 3:
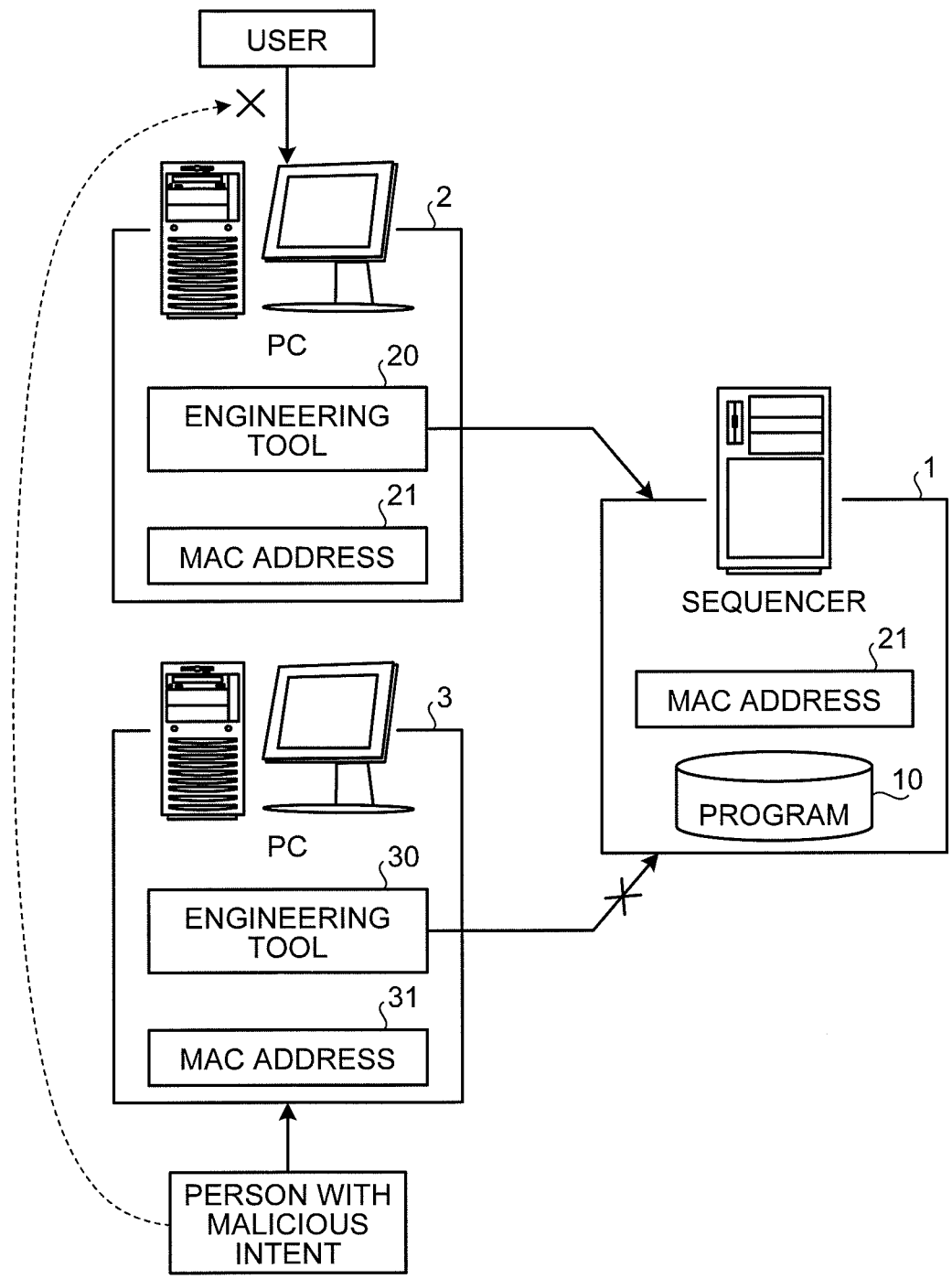
FIG. 3 is an explanatory diagram of an example of executing reading of a program and rejecting a read request according to the procedure shown in FIG. 2.

FIG. 3 is an explanatory diagram of an example of executing reading of a program and rejecting a read request according to the procedure shown in FIG. 2. A sequencer 1 of an FA product is connected to PCs 2 and 3 through a network. It is assumed that a user sets read restriction on a program 10 stored in the sequencer 1 using the PC 2 in the read-restriction setting operation. An engineering tool 20 that is a read-restriction request source transmits a MAC address 21 of the PC 2 to the sequencer 1 together with a read restriction request. By the user setting the read restriction, the MAC address 21 of the PC 2 has been already registered in the sequencer 1.

The user having an access authority requests reading of the program 10 using the PC 2. The engineering tool 20 that is a read request source transmits the MAC address 21 of the PC 2 to the sequencer 1 together with a read request. Under the condition that the MAC address 21 already registered in the sequencer 1 and the MAC address 21 transmitted from the engineering tool 20 match, the sequencer 1 permits the read request from the user having the access authority.

On the other hand, it is assumed that a person with malicious intent having no access authority requests reading of the program 10 using the PC 3. The sequencer 1 requests an engineering tool 30 that is a read request source in this case to transmit a MAC address 31 that is retention individual information. The engineering tool 30 that is the read request source transmits the MAC address 31 of the PC 3 to the sequencer 1 together with a read request. Under the condition that the MAC address 21 already registered in the sequencer 1 and the MAC address 31 transmitted from the engineering tool 30 do not match, the sequencer 1 rejects the read request from the person with malicious intent.

Input of a password is unnecessary for the read request from the user having the access authority. Therefore, even if there is an interception by a person with malicious intent, reading of the program 10 by the person with malicious intent can be prevented. In this way, as advantageous effects, sufficient security can be ensured by the security method for engineering tools and industrial products and the security system.

In the present embodiment, unique individual information to be used for authentication is not limited to the MAC address retained in a PC. The individual information may be any information as long as it is retained in hardware for executing an engineering tool and is unique to enable identification of hardware that is a read-restriction request source. In addition, when the hardware for executing an engineering tool can be identified by individual information held in the engineering tool, any unique individual information held in the engineering tool may be used for the authentication. As the individual information held in the engineering tool, an installation serial number of the engineering tool may be used, for example.

Second Embodiment

Figure 4:
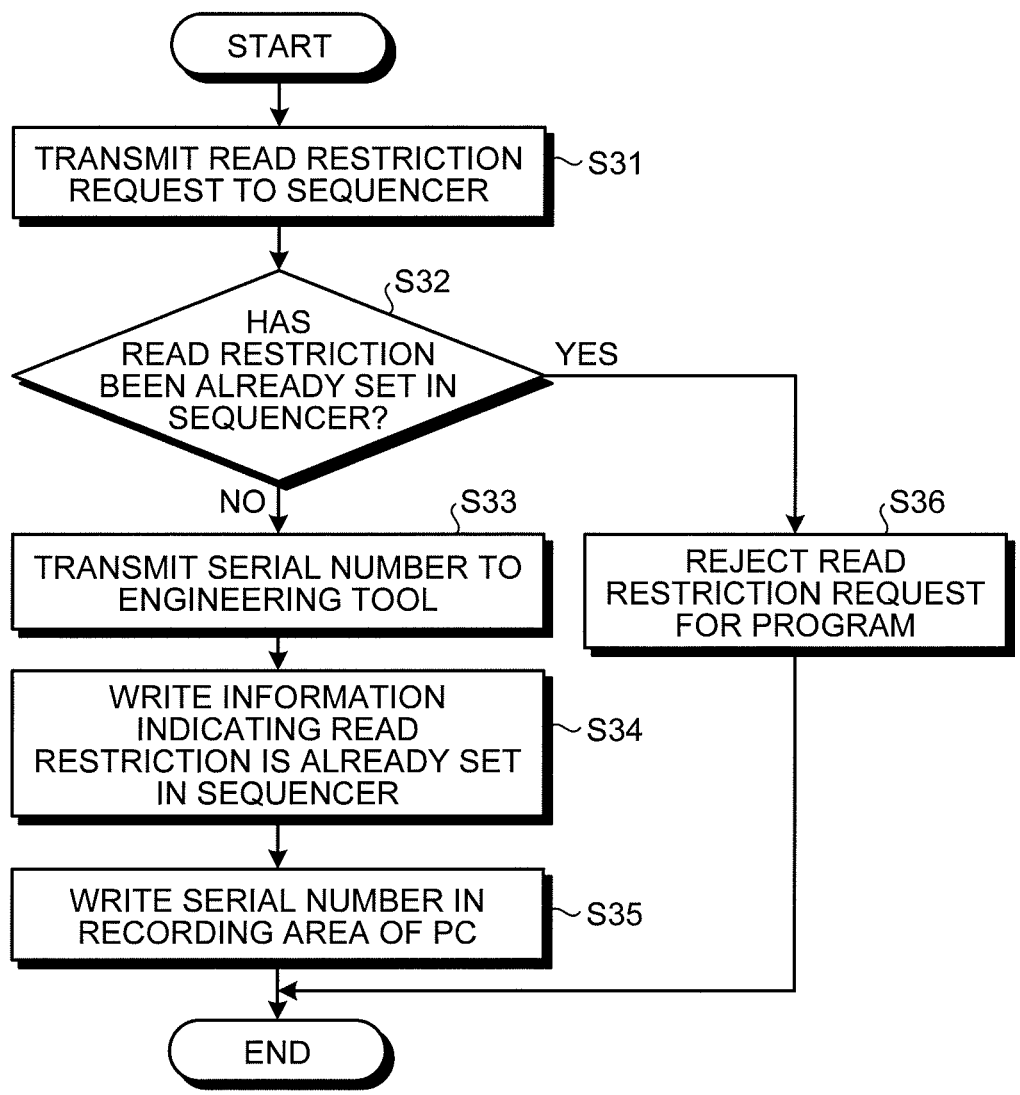
FIG. 4 is a flowchart for explaining a procedure of setting read restriction on a program in a security method for engineering tools and industrial products according to a second embodiment of the present invention.

FIG. 4 is a flowchart for explaining a procedure of setting read restriction on a program in a security method for engineering tools and industrial products according to a second embodiment of the present invention. The present embodiment is characterized in that a serial number that is unique individual information retained in a sequencer is used for the authentication to restrict reading of a program. In the present embodiment, the sequencer carries out authentication check of the unique individual information. Explanations of the second embodiment overlapped with the first embodiment will be omitted as appropriate.

From Step S31 to Step S36 that are read-restriction setting operations, read restriction on a program stored in the sequencer is set in response to a read restriction request to an FA product from an engineering tool that is a read-restriction request source. At Step S31, the engineering tool transmits a read restriction request to the sequencer. At Step S32, the sequencer determines whether or not read restriction has been already set therein.

When the read restriction has been already set in the sequencer (YES at Step S32), the sequencer rejects the read restriction request for the program from the engineering tool (Step S36). In this way, when read restriction has been already set, the read restriction is protected.

Meanwhile, when no read restriction is set in the sequencer (NO at Step S32), the sequencer transmits its own serial number to the engineering tool (Step S33). At Step S34, the sequencer writes therein information indicating that the read restriction has been already set. The order of processes of Steps S33 and S34 is voluntary and these processes can be performed at the same time.

The engineering tool writes the received serial number in a recording area of a PC having the engineering tool installed therein (Step S35). This causes the serial number retained in the sequencer to be registered in the PC as registration individual information. The order of processes of Step S34 and S35 is voluntary and these processes can be performed at the same time.

Figure 5:
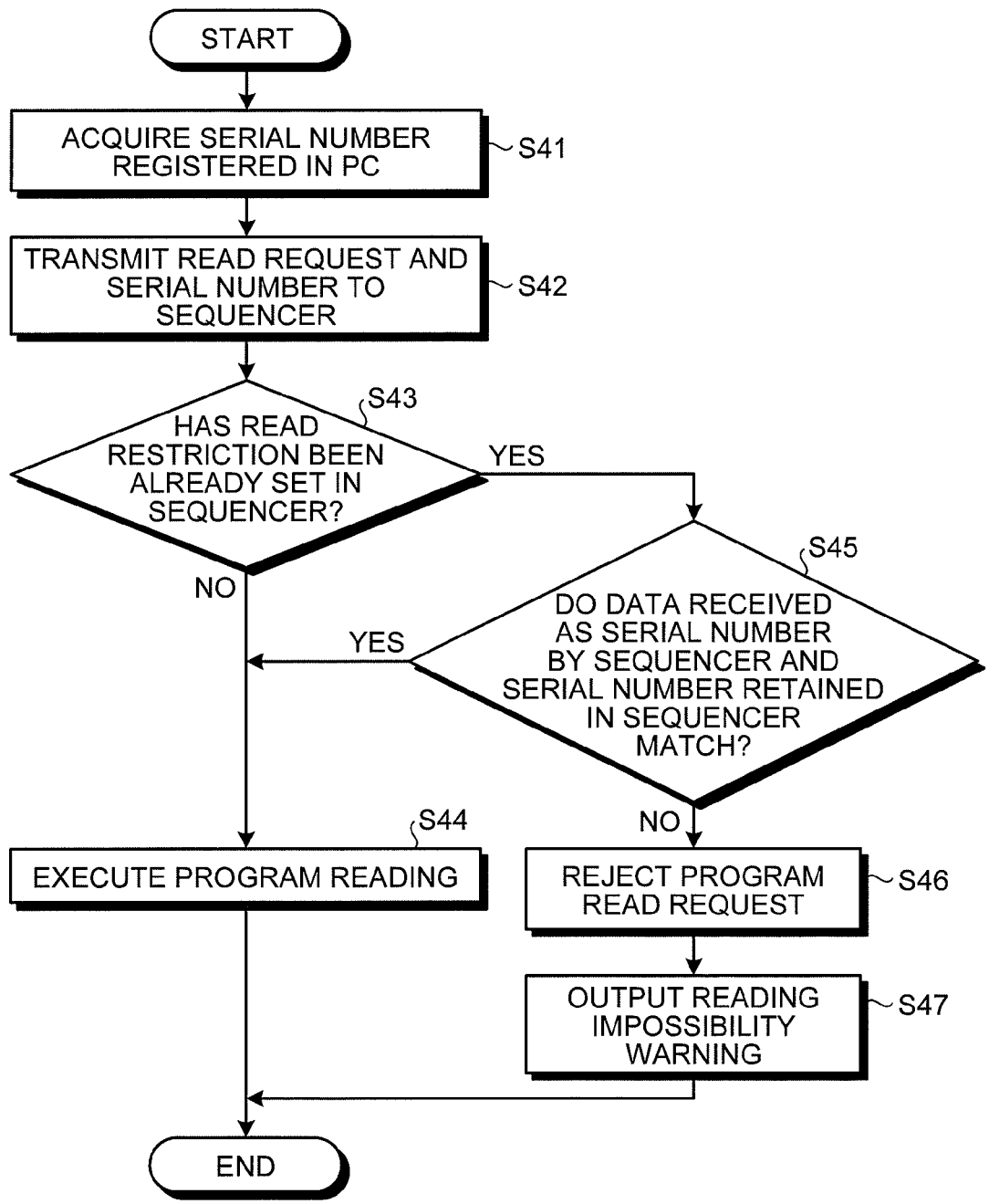
FIG. 5 is a flowchart for explaining a procedure of executing reading of a program and rejecting a read request, in response to the read request for the program according to the second embodiment.

FIG. 5 is a flowchart for explaining a procedure of executing reading of a program and rejecting a read request in response to the read request for the program. At Step S41, an engineering tool acquires data registered in a PC as a serial number (registration individual information). At Step S42 that is a read requesting operation, the engineering tool transmits the data acquired at Step S41 to the sequencer together with a read request.

At Step S43, the sequencer determines whether or not read restriction has been already set therein. Whether or not the read restriction has been already set is determined based on presence or absence of the information written at Step S34. When no read restriction is set in the sequencer (NO at Step S43), the sequencer executes reading of the program in response to the read request (Step S44). When no read restriction is set therein, reading of the program is permitted. Also when no valid data as a serial number are transmitted at Step S42 because no registration individual information is registered in the PC, wherein no read restriction is set in the sequencer, the sequencer permits reading of the program.

When read restriction is set in the sequencer (YES at Step S43), the sequencer compares data received as the serial number (registration individual information) from the engineering tool at Step S42 with a serial number (retention individual information) retained in the sequencer to determine whether or not the data and the serial number match (Step S45). When the data received by the sequencer and the serial number retained in the sequencer match (YES at Step S45), the sequencer executes reading of the program in response to the read request (Step S44).

Meanwhile, when the data received by the sequencer and the serial number retained in the sequencer do not match (NO at Step S45), the sequencer rejects the read request for the program (Step S46). Furthermore, the sequencer outputs a warning of reading impossibility at Step S47. The warning is outputted as display of a message or a sound output, for example. The warning of reading impossibility can be both or one of the message display and the sound output, or intentionally, the warning does not need to be performed. Also when no valid data as the serial number is transmitted at Step S42 because no registration individual information is registered in the PC, wherein read restriction is set in the sequencer, the sequencer rejects reading of the program.

Figure 6:
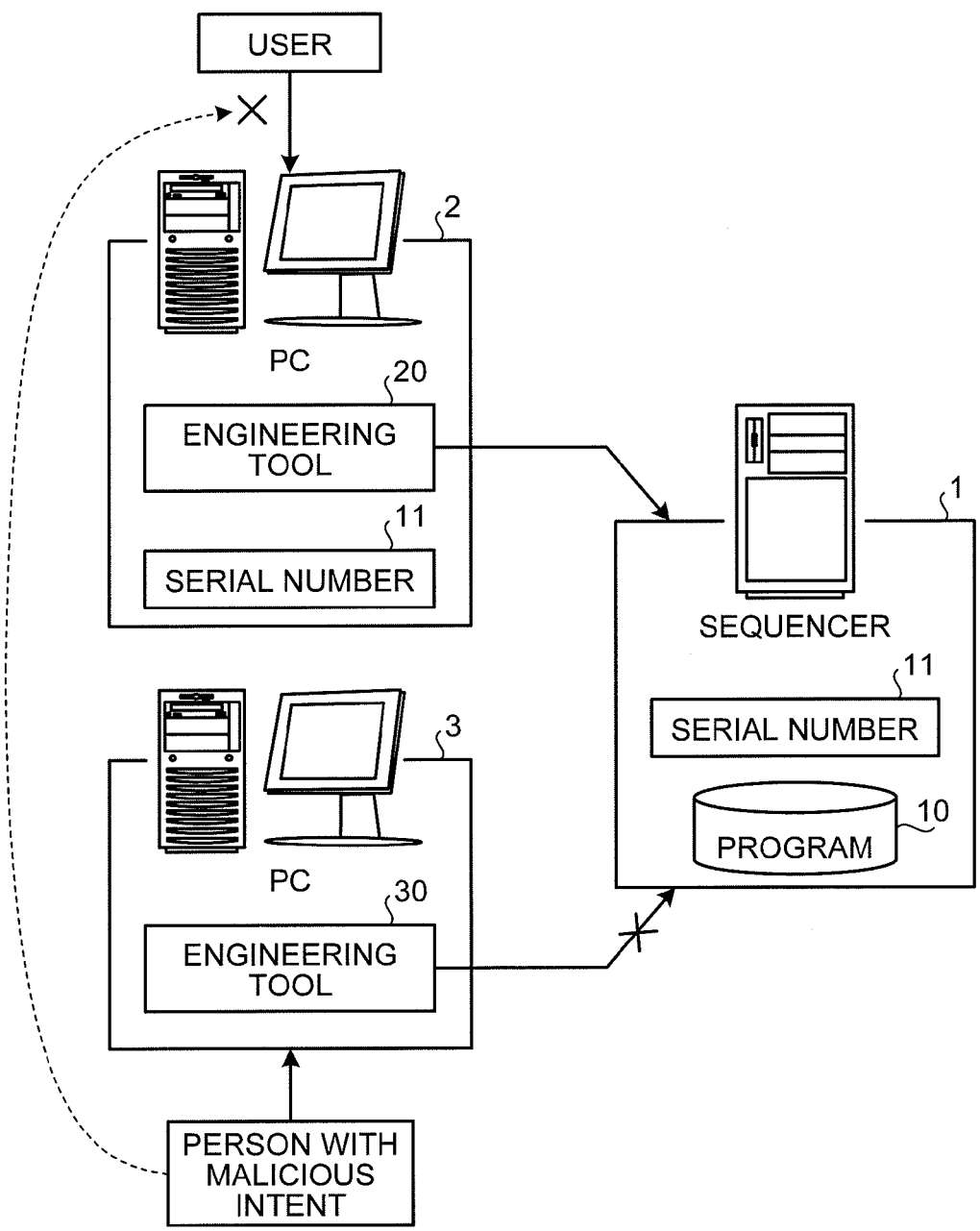
FIG. 6 is an explanatory diagram of an example of executing reading of a program and rejecting a read request according to the procedure shown in FIG. 5.

FIG. 6 is an explanatory diagram of an example of executing reading of a program and rejecting a read request according to the procedure shown in FIG. 5. The sequencer 1 of an FA product is connected to the PCs 2 and 3 through a network. It is assumed that a user sets read restriction on the program 10 stored in the sequencer 1 using the PC 2 in a read-restriction setting operation. When the read restriction is set by the user, a serial number 11 of the sequencer 1 is registered in the PC 2 that executes the engineering tool 20 that is a read-restriction request source.

The user having an access authority requests reading of the program 10 using the PC 2. The engineering tool 20 that is a read request source transmits the serial number 11 registered in the PC 2 to the sequencer 1 together with a read request. Under the condition that the serial number 11 received by the sequencer 1 and the serial number 11 retained in the sequencer 1 match, the sequencer 1 permits the read request from the user having the access authority.

On the other hand, it is assumed that a person with malicious intent having no access authority requests reading of the program 10 using the PC 3. The sequencer 1 requests transmission of the serial number 11 that is registration individual information to the engineering tool 30 that is a read request source in this case. Because no valid data are transmitted from the engineering tool 30 as the read request source as the serial number 11, the sequencer 1 rejects the read request. In this way, the sequencer 1 rejects the read request from the person with malicious intent.

Input of a password is unnecessary for a read request from the user having the access authority. Therefore, even if there is an interception by a person with malicious intent, reading of the program 10 by the person with malicious intent can be prevented. Also in the present embodiment, sufficient security can be ensured as in the first embodiment.

Unique individual information to be used for authentication in the present embodiment is not limited to the serial number retained in the sequencer. The individual information may be any information as long as it is retained in hardware of the industrial product and is unique to enable identification of the hardware of the industrial product.

Third Embodiment

Figure 7:
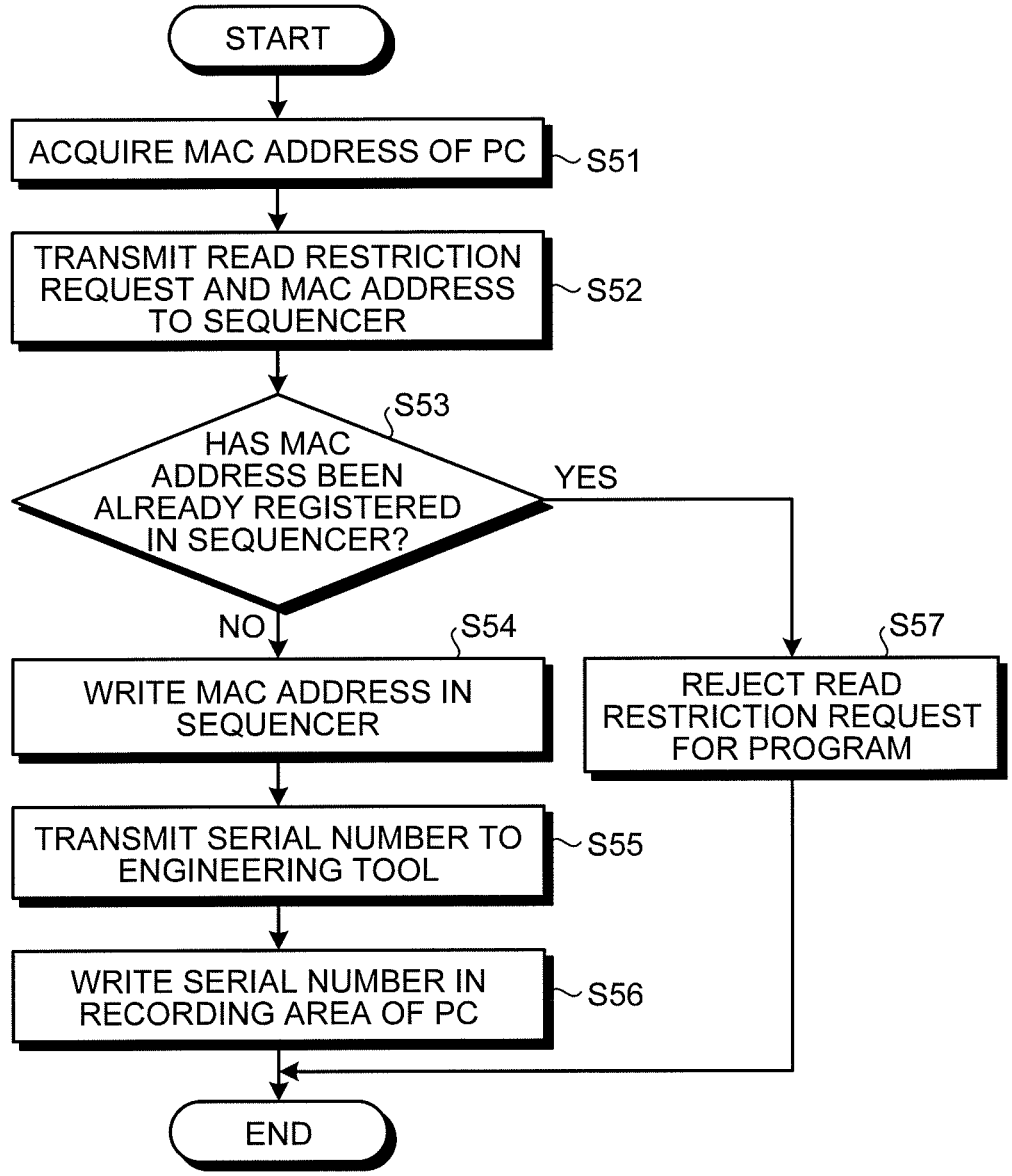
FIG. 7 is a flowchart for explaining a procedure of setting read restriction on a program in a security method for engineering tools and industrial products according to a third embodiment of the present invention.

FIG. 7 is a flowchart for explaining a procedure of setting read restriction on a program in a security method for engineering tools and industrial products according to a third embodiment of the present invention. The present embodiment is characterized in that reading of a program is restricted using the MAC address of a PC and the serial number of the sequencer for authentication. In the present embodiment, the sequencer carries out authentication check of unique individual information. Explanations of the third embodiment overlapped with the first and second embodiments will be omitted as appropriate.

From Step S51 to Step S57 that are read-restriction setting operations, read restriction on a program stored in a sequencer is set in response to a read restriction request to an FA product from an engineering tool that is a read-restriction request source. At Step S51, the engineering tool acquires the MAC address of a PC having the engineering tool installed therein.

At Step S52, the engineering tool transmits the MAC address acquired at Step S51 to the sequencer together with the read restriction request. At Step S53, the sequencer determines whether or not a MAC address has been already registered therein. When a MAC address has been already registered in the sequencer (YES at Step S53), the sequencer rejects the read restriction request for the program from the engineering tool (Step S57). In this way, when read restriction has been already set, the read restriction is protected.

Meanwhile, when no MAC address is registered in the sequencer (NO at Step S53), the sequencer writes therein the MAC address received from the engineering tool (Step S54). This causes the MAC address retained in the PC that executes the engineering tool that is the read-restriction request source, to be registered in the FA product as first registration individual information.

The sequencer then transmits its own serial number to the engineering tool (Step S55). The engineering tool writes the received serial number in a recording area of the PC having the engineering tool installed therein (Step S56). This causes the serial number retained in the sequencer to be registered as second registration individual information in the PC that executes the engineering tool that is the read-restriction request source.

Figure 8:
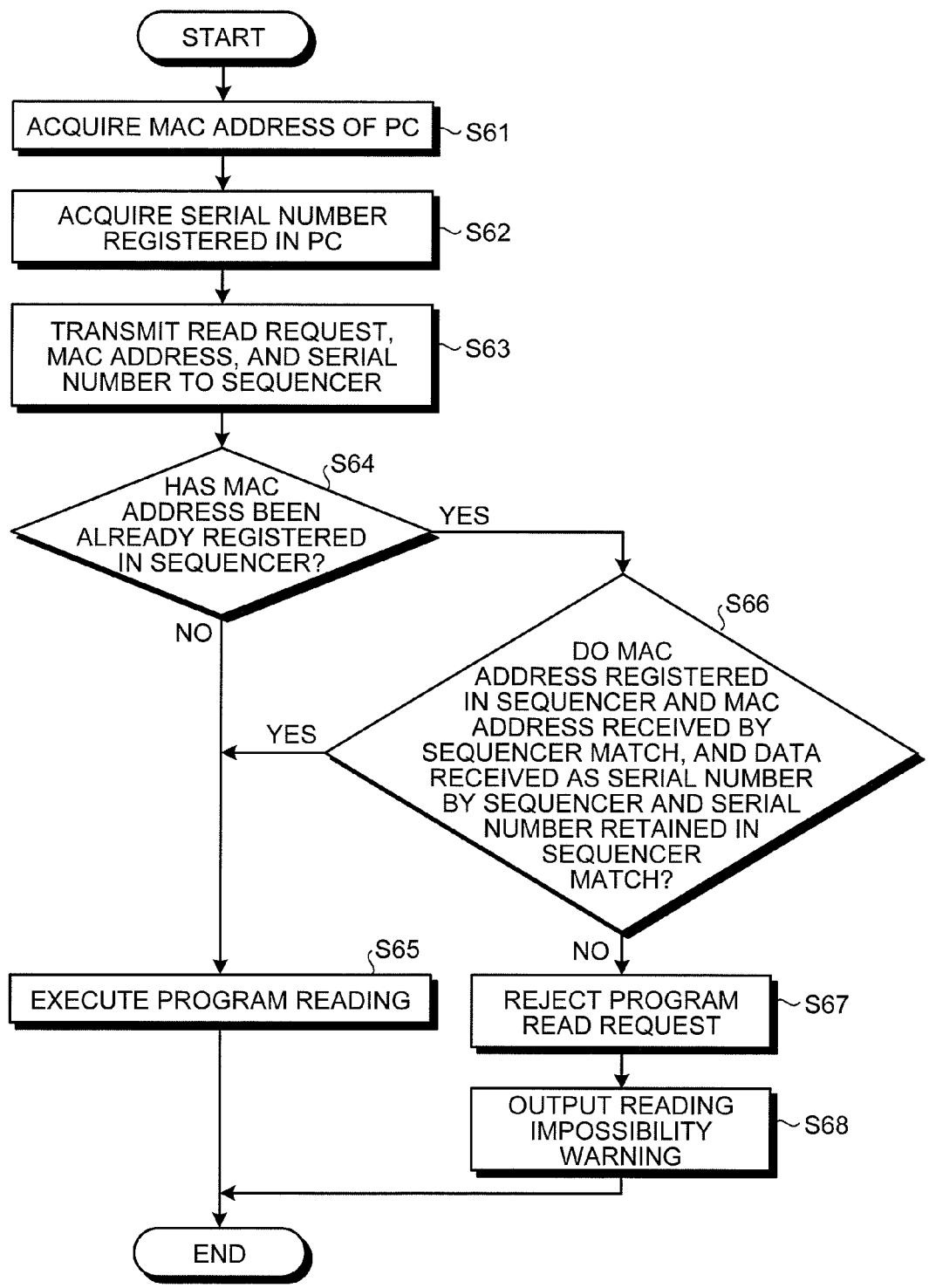
FIG. 8 is a flowchart for explaining a procedure of executing reading of a program and rejecting a read request, in response to the read request for the program according to the third embodiment.

FIG. 8 is a flowchart for explaining a procedure of executing reading of a program and rejecting a read request, in response to the read request for the program. At Step S61, an engineering tool that is a read request source acquires a MAC address (first retention individual information) of a PC having the engineering tool installed therein. At Step S62, the engineering tool acquires data registered as a serial number (second registration individual information) in the PC. At Step S63 that is a read requesting operation, the engineering tool transmits the MAC address acquired at Step S61 and the data acquired at Step S62 to the sequencer together with a read request.

At Step S64, the sequencer determines whether or not a MAC address has been already registered therein. When no MAC address is registered in the sequencer (NO at Step S64), the sequencer executes reading of the program in response to the read request (Step S65). When no MAC address is registered therein, no read restriction is set and thus the sequencer permits reading of the program in this case.

When a MAC address is registered in the sequencer (YES at Step S64), the sequencer compares the MAC address (first registration individual information) registered therein with the MAC address (first retention individual information) received from the engineering tool at Step S63 to determine whether or not these MAC addresses match at Step S66. At Step S66, the sequencer also compares the data received as the serial number (second registration individual information) from the engineering tool at Step S63 with a serial number (second retention individual information) retained therein to determine whether or not the data and the serial number match.

When the MAC address already registered in the sequencer and the MAC address received by the sequencer match and the data received as the serial number by the sequencer and the serial number retained in the sequencer match (YES at Step S66), the sequencer executes reading of the program in response to the read request (Step S65).

On the other hand, in at least one of the case where the MAC address registered in the sequencer and the MAC address received by the sequencer do not match and the case where the data received by the sequencer and the serial number retained in the sequencer do not match (NO at Step S66), the sequencer rejects the read request for the program (Step S67). Furthermore, the sequencer outputs a warning of reading impossibility at Step S68. The warning is outputted as display of a message or a sound output, for example. The warning of reading impossibility may be both or one of the message display and the sound output, or intentionally, the warning does not need to be performed.

Figure 9:
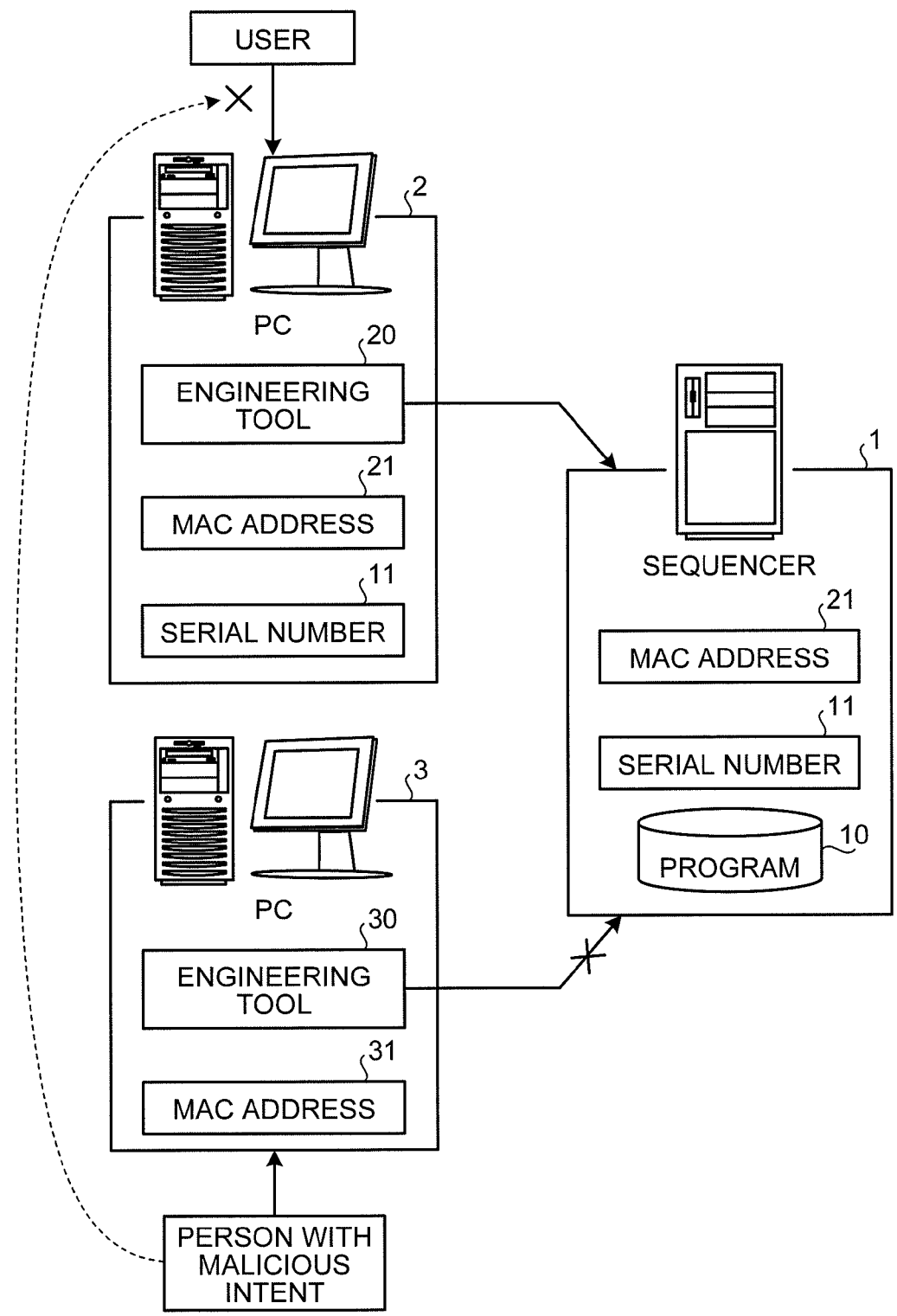
FIG. 9 is an explanatory diagram of an example of executing reading of a program and rejecting a read request according to the procedure shown in FIG. 8.

FIG. 9 is an explanatory diagram of an example of executing reading of a program and rejecting a read request according to the procedure shown in FIG. 8. The sequencer 1 of an FA product is connected to the PCs 2 and 3 through a network. It is assumed that a user sets read restriction on the program 10 stored in the sequencer 1 using the PC 2 in the read-restriction setting operation.

The engineering tool 20 that is a read-restriction request source transmits the MAC address 21 of the PC 2 to the sequencer 1 together with read restriction request. Because the user has set the read restriction, the MAC address 21 of the PC 2 has been registered in the sequencer 1. Furthermore, a serial number 11 of the sequencer 1 has been already registered in the PC 2 for executing the engineering tool 20 that is the read-restriction request source by virtue of the user's setting of the read restriction.

The user having an access authority requests reading of the program 10 using the PC 2. The engineering tool 20 that is a read request source transmits the MAC address 21 of the PC 2 and the serial number 11 registered in the PC 2 to the sequencer 1 together with a read request. Under the condition that the MAC address 21 registered in the sequencer 1 and the MAC address 21 transmitted from the engineering tool 20 match and the serial number 11 received by the sequencer 1 and the serial number 11 retained in the sequencer 1 match, the sequencer 1 permits the read request from the user having the access authority.

On the other hand, it is assumed that a person with malicious intent having no access authority requests reading of the program 10 using the PC 3. The sequencer 1 requests the engineering tool 30 that is the read request source in this case to transmit the MAC address 31 that is the first retention individual information and the serial number 11 that is the second registration individual information. The engineering tool 30 as the read request source transmits the MAC address 31 of the PC 3 to the sequencer 1 together with a read request.

Because the MAC address 21 registered in the sequencer 1 and the MAC address 31 transmitted from the engineering tool 30 do not match and no valid data are transmitted as the serial number 11 from the engineering tool 30, the sequencer 1 rejects the read request. In this way, the sequencer 1 rejects a read request from a person with malicious intent.

In the present embodiment, double authentication using the MAC address of a PC and the serial number of the sequencer is adopted, thereby making it possible to ensure higher security. Also in the present embodiment, unique individual information to be used for the authentication is not limited to the MAC address retained in a PC and the serial number retained in the sequencer, and may be any information.

Fourth Embodiment

Figure 10:
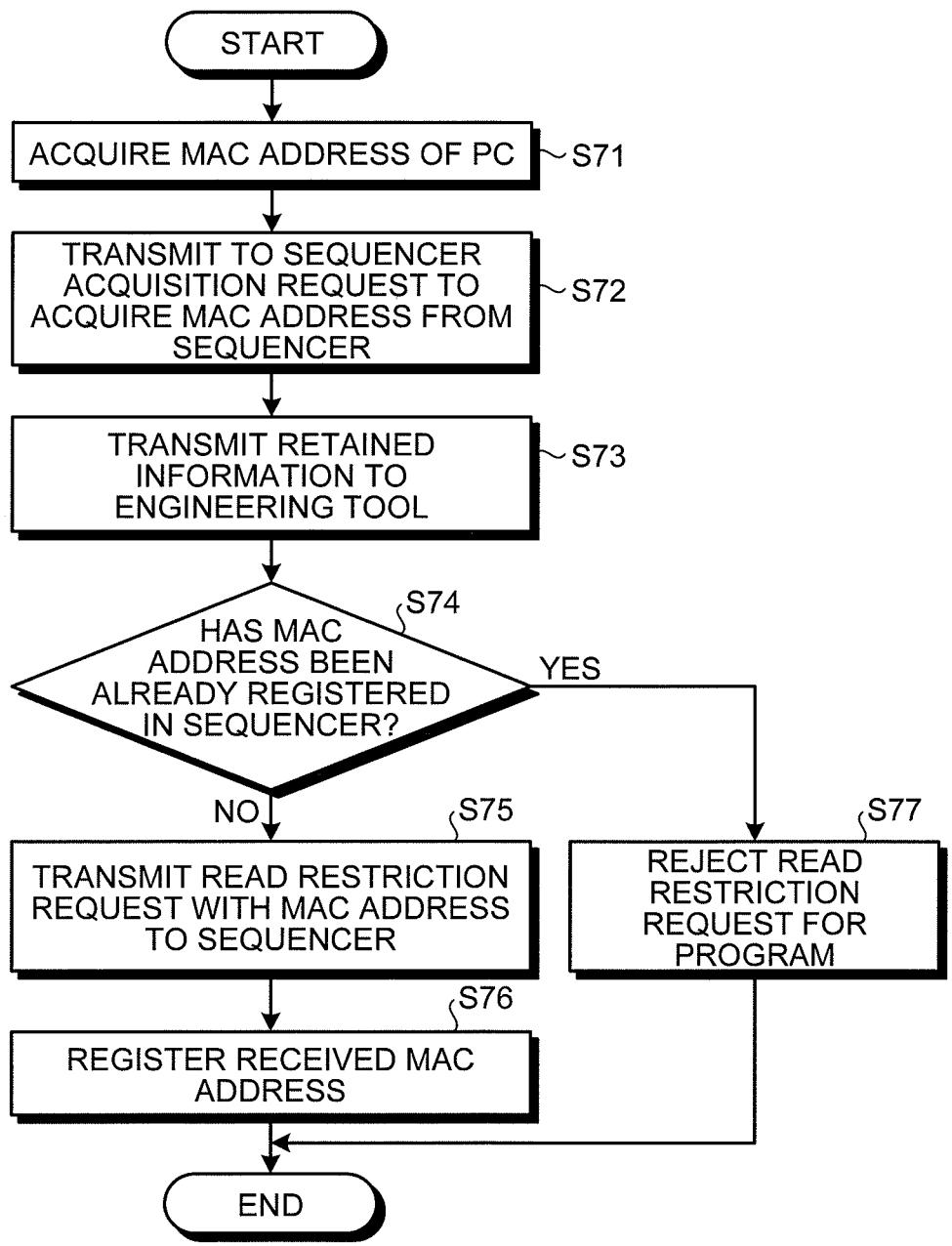
FIG. 10 is a flowchart for explaining a procedure of setting read restriction on a program in a security method for engineering tools and industrial products according to a fourth embodiment of the present invention.

FIG. 10 is a flowchart for explaining a procedure of setting read restriction on a program in a security method for engineering tools and industrial products according to a fourth embodiment of the present invention. In the present embodiment, unique individual information retained in each PC, e.g., the MAC address is used for authentication to restrict reading of a program. In the present embodiment, a PC that is hardware for executing an engineering tool carries out authentication check of the unique individual information.

In a read-restriction setting operation (from Step S71 to Step S77), read restriction on a program stored in a sequencer is set in response to a read restriction request to an FA product from an engineering tool that is a read-restriction request source. The engineering tool acquires a MAC address of a PC having the engineering tool installed therein (Step S71).

The engineering tool transmits to the sequencer an acquisition request for acquiring the MAC address of the PC from the sequencer (Step S72). The sequencer transmits information retained therein to the engineering tool in response to the acquisition request (Step S73).

The engineering tool then compares the MAC address acquired from the PC with the information received from the sequencer to determine whether or not the MAC address of the PC has been already registered in the sequencer (Step S74). For example, when no MAC address is registered in the sequencer, a specific initial value is stored in an area for retaining the MAC address of a PC so that a registration state can be determined by only referring to the information stored in the area.

When a MAC address of a PC is registered in the sequencer (YES at Step S74), the engineering tool rejects the read restriction request for the program (Step S77).

On the other hand, when no MAC address is registered in the sequencer (NO at Step S74), the engineering tool transmits a read restriction request to the sequencer with the MAC address of the PC having the engineering tool installed therein (Step S75). The sequencer registers therein the MAC address received from the engineering tool (Step S76). In this way, the MAC address retained in the PC that executes the engineering tool that is the read-restriction request source is registered in the FA product as registration individual information.

Figure 11:
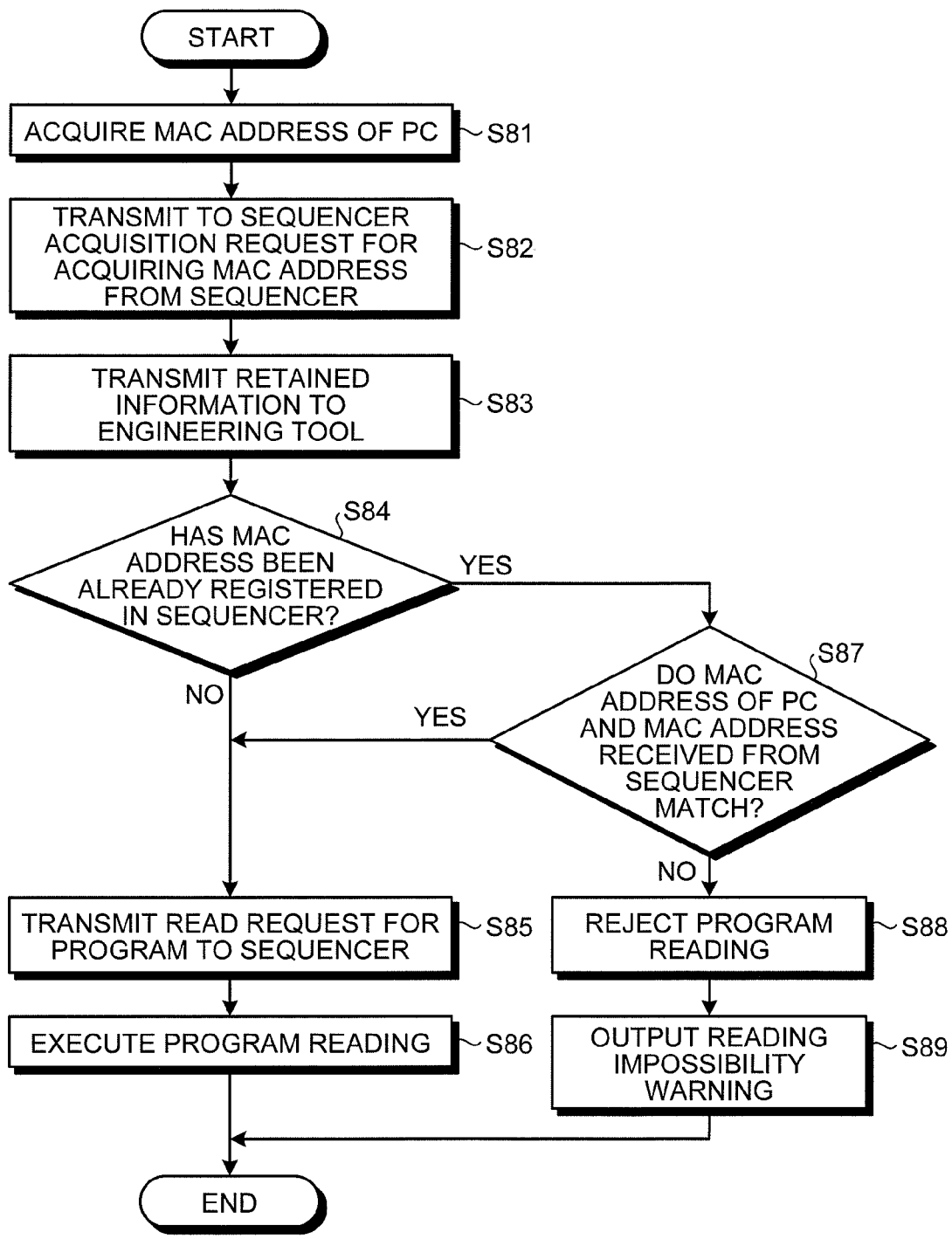
FIG. 11 is a flowchart for explaining a procedure of executing reading of a program and rejecting the reading, in response to a read request for the program according to the fourth embodiment.

FIG. 11 is a flowchart for explaining a procedure of executing reading of a program and rejecting the reading, in response to a read request for the program. An engineering tool that is a read request source acquires a MAC address (retention individual information) of a PC having the engineering tool installed therein (Step S81). The engineering tool transmits to a sequencer an acquisition request for acquiring a MAC address of a PC from the sequencer (Step S82). The sequencer transmits information retained therein to the engineering tool in response to the acquisition request (Step S83).

The engineering tool then compares the MAC address acquired from the PC with the information received from the sequencer to determine whether or not a MAC address of a PC has been already registered in the sequencer (Step S84). When no MAC address has been registered in the sequencer (NO at Step S84), the engineering tool transmits a read request for the program to the sequencer (Step S85). The sequencer executes reading of the program in response to the read request (Step S86).

When a MAC address is registered in the sequencer (YES at Step S84), the engineering tool compares the MAC address (retention individual information) acquired from the PC with the MAC address (registration individual information) received from the sequencer in response to the acquisition request (Step S87). When the MAC address acquired from the PC and the MAC address received from the sequencer match (YES at Step S87), the engineering tool transmits a read request for the program to the sequencer (Step S85). The sequencer executes reading of the program in response to the read request (Step S86).

On the other hand, when the MAC address acquired from the PC and the MAC address received from the sequencer do not match (NO at Step S87), the engineering tool rejects reading of the program (Step S88). Furthermore, the engineering tool outputs a warning of reading impossibility (Step S89). The warning is outputted as display of a message or a sound output, for example. The warning of reading impossibility may be both or one of the message display and the sound output, or intentionally, the warning does not need to be performed.

Also in the present embodiment, sufficient security can be ensured. In the present embodiment, unique individual information to be used for the authentication is not limited to the MAC address retained in the PC. The individual information may be any information as long as it is retained in hardware for executing an engineering tool and is unique to enable identification of hardware that is a read-restriction request source.

When hardware for executing an engineering tool can be identified by individual information held in the engineering tool, unique individual information held in the engineering tool may be used for the authentication. As the individual information held in the engineering tool, an installation serial number of the engineering tool may be used, for example.

Fifth Embodiment

Figure 12:
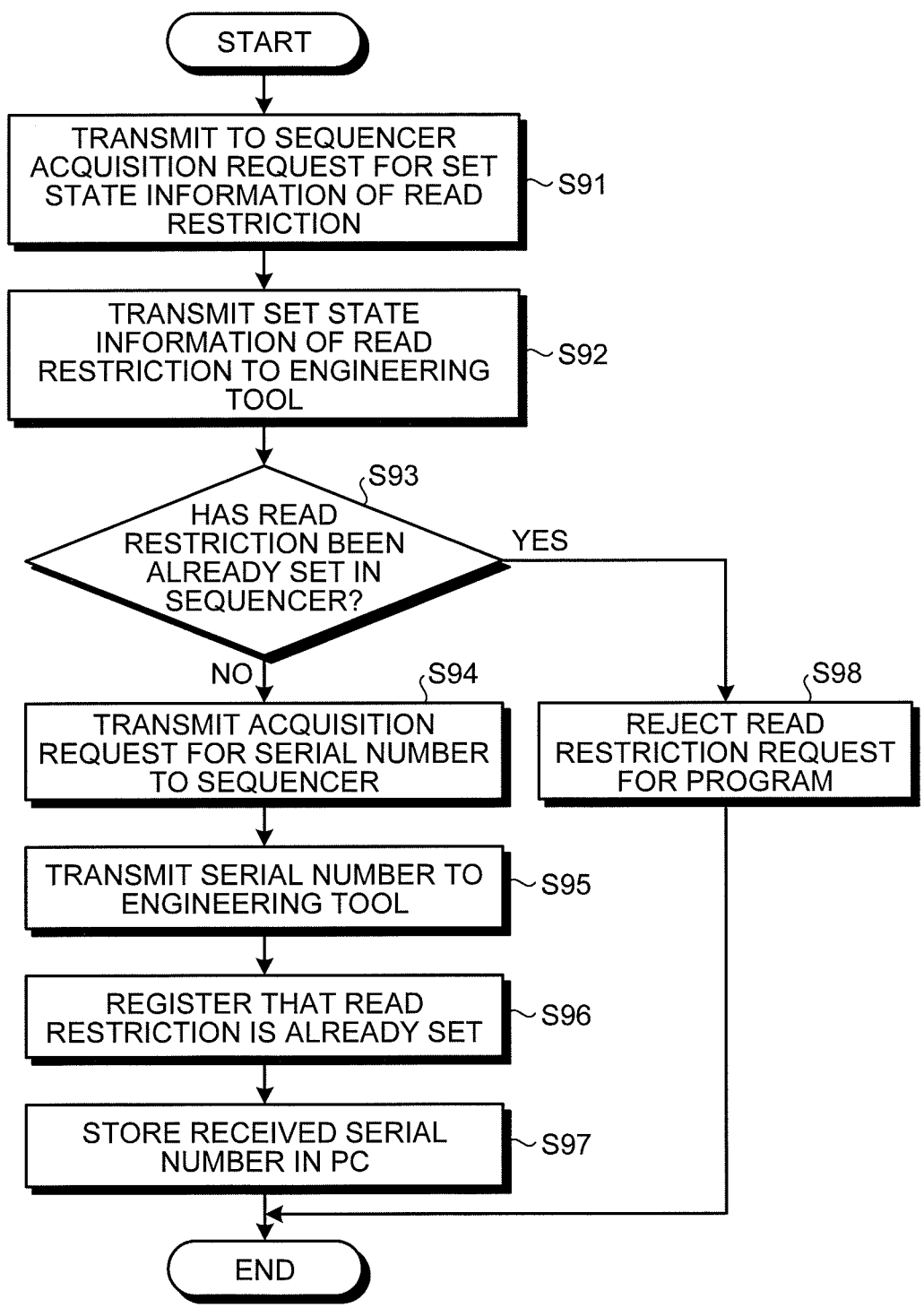
FIG. 12 is a flowchart for explaining a procedure of setting read restriction on a program in a security method for engineering tools and industrial products according to a fifth embodiment of the present invention.

FIG. 12 is a flowchart for explaining a procedure of setting read restriction on a program in a security method for engineering tools and industrial products according to a fifth embodiment of the present invention. The present embodiment restricts reading of the program using unique individual information retained in a sequencer, for example, a serial number for authentication. In the present embodiment, a PC that is hardware that executes an engineering tool carries out authentication check of unique individual information.

In read-restriction setting operations (from Step S91 to Step S98), read restriction on a program stored in a sequencer is set in response to a read restriction request to an FA product from an engineering tool that is a read-restriction request source. The engineering tool transmits to the sequencer an acquisition request for acquiring set state information of read restriction (Step S91). The sequencer transmits the set state information of read restriction to the engineering tool in response to the acquisition request (Step S92). The set state information of read restriction is information indicating whether or not read restriction on a program has been set in the sequencer.

The engineering tool determines whether or not read restriction has been already set in the sequencer based on the set state information of read restriction received from the sequencer (Step S93). When read restriction has been already set in the sequencer (YES at Step S93), the engineering tool rejects the read restriction request for the program (Step S98).

On the other hand, when no read restriction is set in the sequencer (NO at Step S93), the engineering tool transmits to the sequencer an acquisition request for acquiring a serial number of the sequencer (Step S94). The sequencer transmits the serial number retained therein to the engineering tool in response to the acquisition request (Step S95).

The sequencer registers therein information about the fact that read restriction has been already registered, as set state information of read restriction to be retained therein (Step S96). The order of processes of Steps S95 and S96 is voluntary and these processes may be performed at the same time. The engineering tool stores the serial number received from the sequencer in the PC (Step S97). In this way, the serial number retained in the sequencer is registered as registration individual information in the PC. The order of processes of Steps S96 and S97 is voluntary and these processes may be performed at the same time.

Figure 13:
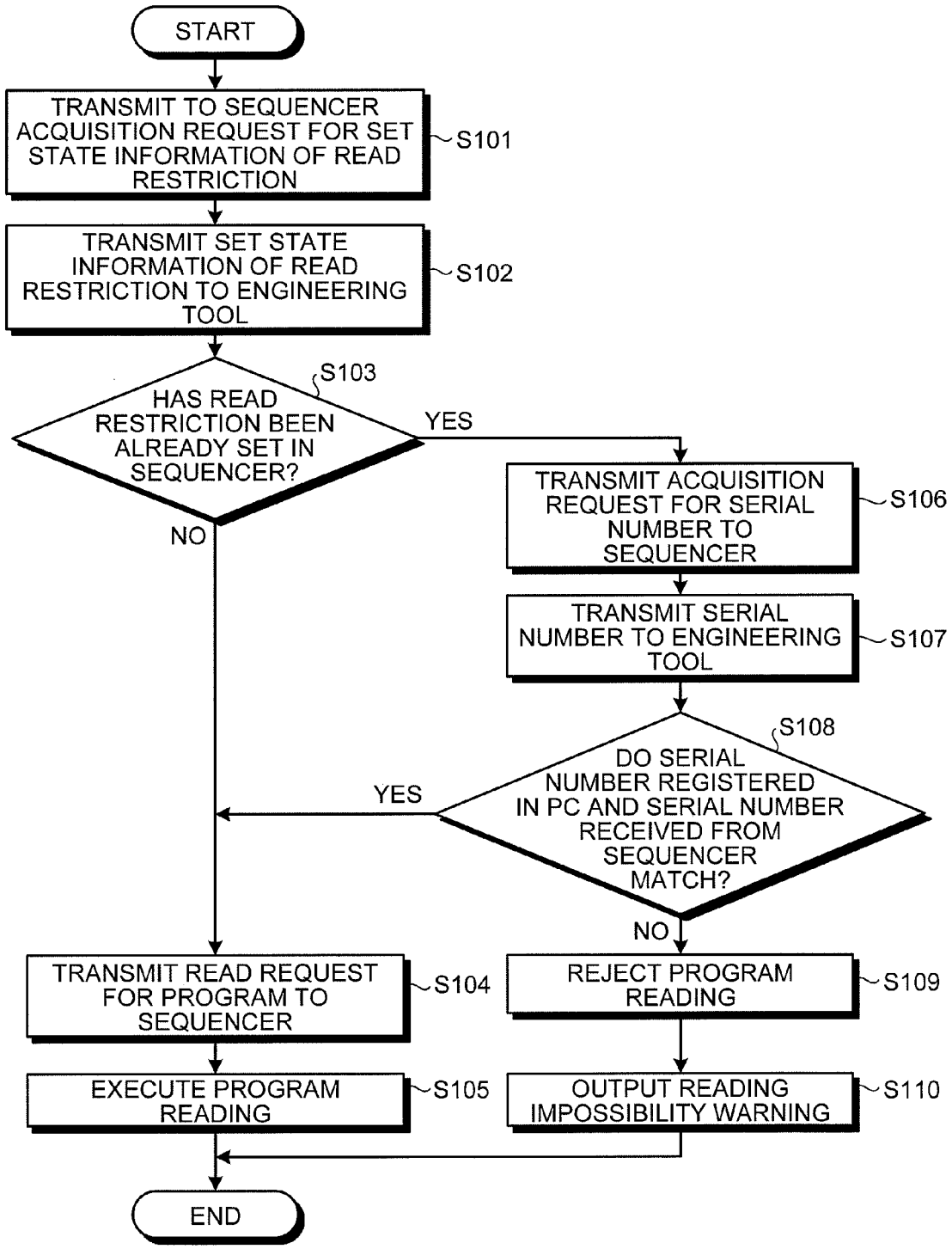
FIG. 13 is a flowchart for explaining a procedure of executing reading of a program and rejecting the reading, in response to a read request for the program according to the fifth embodiment.

FIG. 13 is a flowchart for explaining a procedure of executing reading of a program and rejecting the reading in response to a read request for the program. An engineering tool transmits to a sequencer an acquisition request for acquiring set state information of read restriction (Step S101). The sequencer transmits the set state information of read restriction to the engineering tool in response to the acquisition request (Step S102).

The engineering tool determines whether or not read restriction has been already set in the sequencer based on the set state information of read restriction received from the sequencer (Step S103). When no read restriction has been set in the sequencer (NO at Step S103), the engineering tool transmits a read request for the program to the sequencer (Step S104). The sequencer executes reading of the program in response to the read request (Step S105).

When read restriction has been set in the sequencer (YES at Step S103), the engineering tool transmits to the sequencer an acquisition request for acquiring a serial number of the sequencer (Step S106). The sequencer transmits the serial number retained therein to the engineering tool in response to the acquisition request (Step S107).

The engineering tool then compares a serial number (registration individual information) registered in the PC with the serial number (retention individual information) received from the sequencer in response to the acquisition request (Step S108). When the serial number registered in the PC and the serial number received from the sequencer match (YES at Step S108), the engineering tool transmits a read request for the program to the sequencer (Step S104). The sequencer executes reading of the program in response to the read request (Step S105).

On the other hand, when the serial number registered in the PC and the serial number received from the sequencer do not match (NO at Step S108), the engineering tool rejects reading of the program (Step S109). Furthermore, the engineering tool outputs a warning of reading impossibility (Step S110). The warning is outputted as display of a message or a sound output, for example. The warning of reading impossibility may be both or one of the message display and the sound output, or intentionally, the warning does not need to be performed.

Also in the present embodiment, sufficient security can be ensured. Unique individual information to be used for the authentication in the present embodiment is not limited to the serial number retained in the sequencer. The individual information may be any information as long as it is retained in hardware of an industrial product and is unique to enable identification of the hardware of the industrial product.

Sixth Embodiment

Figure 14:
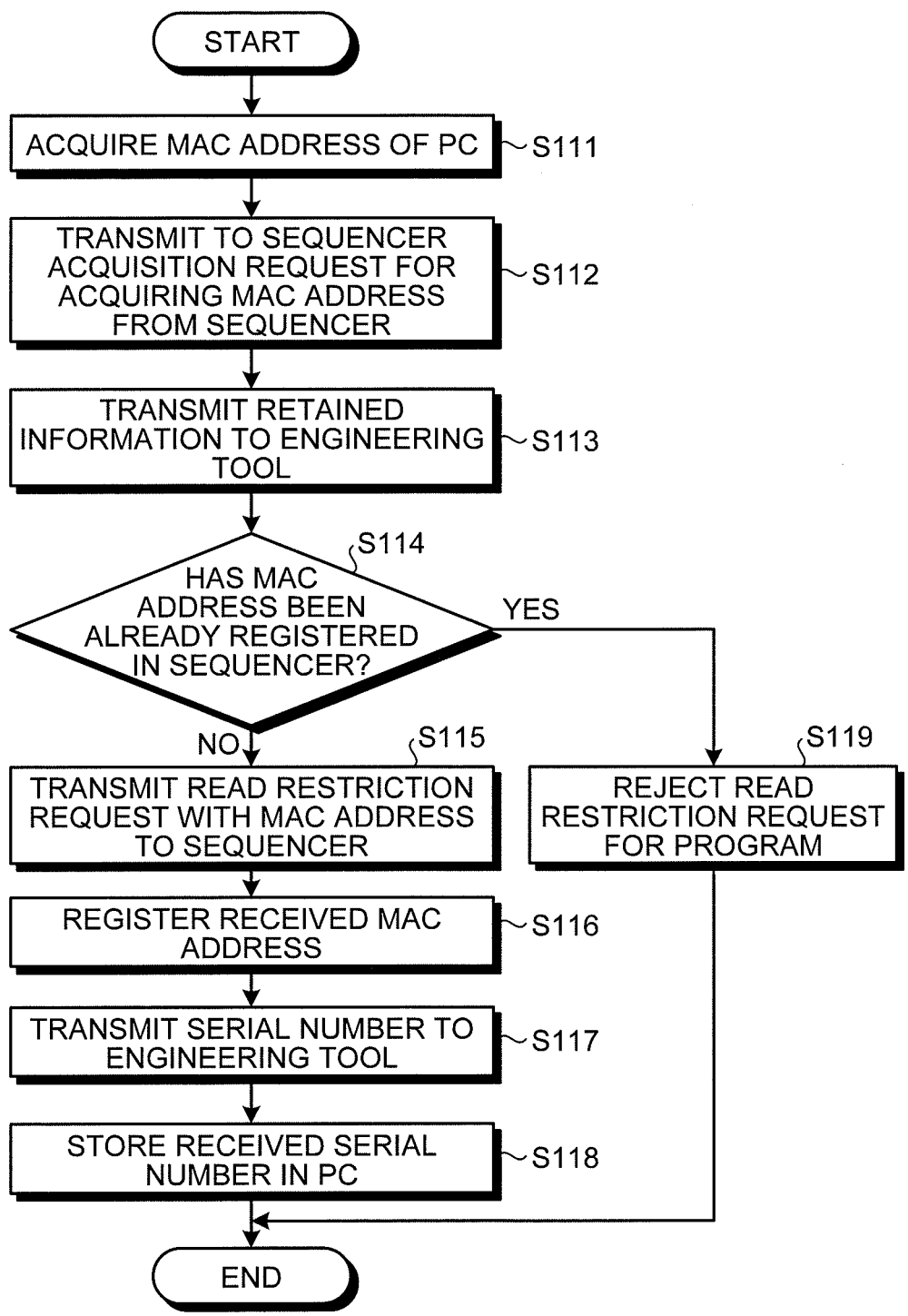
FIG. 14 is a flowchart for explaining a procedure of setting read restriction on a program in a security method for engineering tools and industrial products according to a sixth embodiment of the present invention.

FIG. 14 is a flowchart for explaining a procedure of setting read restriction on a program in a security method for engineering tools and industrial products according to a sixth embodiment of the present invention. The present embodiment restricts reading of the program using a MAC address of a PC and a serial number of a sequencer for authentication. In the present embodiment, a PC that is hardware that executes an engineering tool carries out authentication check of unique individual information.

In read-restriction setting operations (from Step S111 to Step S119), read restriction on a program stored in a sequencer is set in response to a read restriction request to an FA product from an engineering tool that is a read-restriction request source. The engineering tool acquires a MAC address of a PC having the engineering tool installed therein (Step S111).

The engineering tool transmits to a sequencer an acquisition request for acquiring a MAC address of a PC from the sequencer (Step S112). The sequencer transmits information retained therein to the engineering tool in response to the acquisition request (Step S113).

The engineering tool then compares the MAC address acquired from the PC with the information received from the sequencer to determine whether or not a MAC address of a PC has been already registered in the sequencer (Step S114). When a MAC address of a PC has been registered in the sequencer (YES at Step S114), the engineering tool rejects a read restriction request for the program (Step S119).

On the other hand, when no MAC address is registered in the sequencer (NO at Step S114), the engineering tool transmits a read restriction request to the sequencer with the MAC address of the PC having the engineering tool installed therein (Step S115). The sequencer registers therein the MAC address received from the engineering tool (Step S116). In this way, the MAC address retained in the PC for executing the engineering tool that is the read-restriction request source is registered in the FA product as first registration individual information.

The sequencer transmits a serial number retained therein to the engineering tool (Step S117). The engineering tool stores the serial number received from the sequencer in the PC (Step S118). In this way, the serial number retained in the sequencer is registered as second registration individual information in the PC for executing the engineering tool that is the read-restriction request source.

Figure 15:
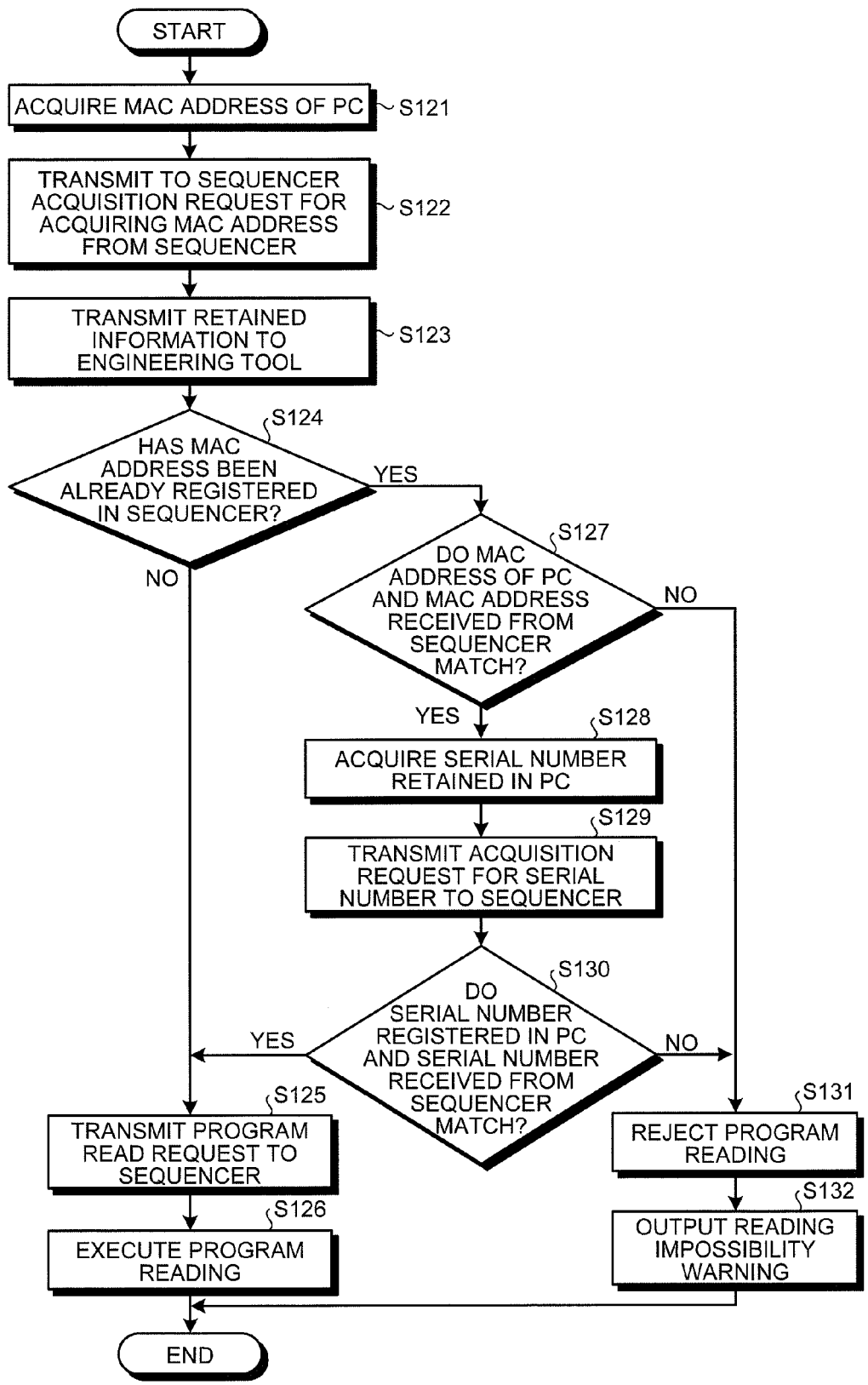
FIG. 15 is a flowchart for explaining a procedure of executing reading of a program and rejecting the reading, in response to a read request for the program according to the sixth embodiment.

FIG. 15 is a flowchart for explaining a procedure of executing reading of a program and rejecting the reading in response to a read request for the program. An engineering tool acquires a MAC address of a PC having the engineering tool installed therein (Step S121). The engineering tool transmits to a sequencer an acquisition request for acquiring a MAC address of a PC from the sequencer (Step S122). The sequencer transmits information retained therein to the engineering tool in response to the acquisition request (Step S123).

The engineering tool then compares the MAC address acquired from the PC with the information received from the sequencer to determine whether or not a MAC address of a PC has been already registered in the sequencer (Step S124). When no MAC address has been registered in the sequencer (NO at Step S124), the engineering tool transmits a read request for the program to the sequencer (Step S125). The sequencer performs reading of the program in response to the read request (Step S126).

When a MAC address has been registered in the sequencer (YES at Step S124), the engineering tool compares the MAC address (first retention individual information) acquired from the PC with the MAC address (first registration individual information) received from the sequencer in response to the acquisition request (Step S127).

When the MAC address acquired from the PC and the MAC address received from the sequencer match (YES at Step S127), the engineering tool acquires a serial number registered in the PC (Step S128). The engineering tool also transmits to the sequencer an acquisition request for acquiring a serial number of the sequencer (Step S129).

The engineering tool then compares the serial number (second registration individual information) registered in the PC with the serial number (second retention individual information) received from the sequencer in response to the acquisition request (Step S130). When the serial number registered in the PC and the serial number received from the sequencer match (YES at Step S130), the engineering tool transmits a read request for the program to the sequencer (Step S125). The sequencer executes reading of the program in response to the read request (Step S126).

When the MAC address acquired from the PC and the MAC address received from the sequencer do not match (NO at Step S127) or when the serial number registered in the PC and the serial number received from the sequencer do not match (NO at Step S130), the engineering tool rejects reading of the program (Step S131). Furthermore, the engineering tool outputs a warning of reading impossibility (Step S132). The warning is outputted as display of a message or a sound output, for example. The warning of reading impossibility may be both or one of the message display and the sound output, or intentionally, the warning does not need to be performed.

In the present invention, double authentication using the MAC address of the PC and the serial number of the sequencer is adopted thereby making it possible to ensure higher security. Also in the present embodiment, unique individual information to be used for the authentication is not limited to the MAC address retained in the PC and the serial number retained in the sequencer and may be any information.

If read restriction on a program is set between hardware of an FA product and hardware that executes an engineering tool, when identification information for identifying the hardware of the FA product and determination information transmitted or received by the engineering tool to identify the hardware of the FA product has a functional relation (a relation that enables to uniquely determine one when the other is determined), the following may be adopted. The hardware that executes the engineering tool retains one of the identification information and the determination information as well as set state information of read restriction, so that read restriction can be executed without accessing the hardware of the FA product. In this way, the number of communications to be performed between the hardware of the FA product and the hardware that executes the engineering tool can be reduced.

INDUSTRIAL APPLICABILITY

As described above, the security method for engineering tools and industrial products and the security system according to the present invention are useful for ensuring security of a program stored in hardware of an FA product.

REFERENCE SIGNS LIST

1 SEQUENCER
2, 3 PC
10 PROGRAM
11 SERIAL NUMBER
20, 30 ENGINEERING TOOL
21, 31 MAC ADDRESS

The invention claimed is:

1. A security method for engineering tools and industrial products, the security method comprising:
   a read-restriction setting operation comprising setting read restriction on a program stored in hardware of an industrial product in response to a read restriction request that originates and is directly transmitted to the industrial product from an engineering tool that is a read-restriction request source; and
   a read requesting operation comprising transmitting a read request for the program from an engineering tool that is a read request source to the industrial product, wherein
   in the read-restriction setting operation, second unique individual information retained in the hardware of the industrial product is transmitted to hardware for executing the engineering tool and registered as registration individual information in the hardware for executing the engineering tool, and
   in the read requesting operation, the second unique individual information retained in the hardware of the industrial product is compared with the registration individual information after the read request is transmitted, and wherein
   in the read-restriction setting operation, first unique individual information retained in the hardware for executing the engineering tool that is the read-restriction request source is registered as first registration individual information that is different from registration individual information in the industrial product, and
   the second unique individual information retained in the hardware of the industrial product is registered as second registration individual information that is the registration individual information in the engineering tool that is the read-restriction request source, and
   in the read requesting operation, first retention individual information that is the first unique individual information retained in the hardware for executing the engineering tool that is the read request source and the second registration individual information are transmitted together with the read request, the first registration individual information registered in the industrial product and the first retention individual information transmitted from the engineering tool that is the read-restriction request source are compared with each other in the industrial product, the second registration individual information transmitted from the engineering tool that is the read request source and second retention individual information that is individual information retained in the hardware of the industrial product are compared with each other, and the hardware of the industrial product rejects the read request in at least one of the case where the first registration individual information and the first retention individual information do not match and the case where the second registration individual information and the second retention individual information do not match.

2. The security method for engineering tools and industrial products according to claim 1, wherein in the read requesting operation, the engineering tool that is the read request source transmits the registration individual information together with the read request, the registration individual information transmitted from the engineering tool that is the read request source and retention individual information that is individual information retained in the hardware of the industrial product are compared with each other in the industrial product, the hardware of the industrial product executes reading of the program in response to the read request when the registration individual information and the retention individual information match, and the hardware of the industrial product rejects the read request when the registration individual information and the retention individual information do not match.

3. The security method for engineering tools and industrial products according to claim 1, wherein the first unique individual information retained in the hardware for executing the engineering tool is a MAC address.

4. The security method for engineering tools and industrial products according to claim 2, wherein the second unique individual information retained in the hardware of the industrial product is a serial number.

5. The security method for engineering tools and industrial products according to claim 2, wherein information indicating that the read restriction has been already set is registered in the industrial product in the read-restriction setting operation.

6. The security method for engineering tools and industrial products according to claim 1, wherein the hardware of the industrial product rejects the read restriction request when confirming that the registration individual information has been already registered in the read-restriction setting operation.

7. The security method for engineering tools and industrial products according to claim 1, wherein the hardware of the industrial product outputs a warning of reading impossibility when rejecting reading of the program.

* * * * *